United States Patent [19]

Suzuki

[11] Patent Number: 4,612,446

[45] Date of Patent: Sep. 16, 1986

[54] WEB TERMINAL DETECTING DEVICE

[75] Inventor: Kenji Suzuki, Shizuoka, Japan

[73] Assignee: Star Seimitsu Kabushiki Kaisha, Shizuoka, Japan

[21] Appl. No.: 651,215

[22] Filed: Sep. 14, 1984

[30] Foreign Application Priority Data

Sep. 14, 1983 [JP] Japan ................................ 58-168421

[51] Int. Cl.[4] ................................................ G06K 7/10

[52] U.S. Cl. ...................................... 250/570; 400/249

[58] Field of Search ........... 250/560, 561, 570, 223 R; 400/208, 219, 239, 249, 711

[56] References Cited

U.S. PATENT DOCUMENTS 3,369,126 2/1968 Adams ................................ 250/570
3,614,453 10/1971 Johnson .............................. 250/561
4,401,394 8/1983 Hume et al. ........................ 400/249

*Primary Examiner*—David C. Nelms
*Attorney, Agent, or Firm*—Robert E. Burns; Emmanuel J. Lobato; Bruce L. Adams

[57] ABSTRACT

A device for detecting the terminal of a web such as an ink ribbon which is accommodated in a cassette, in which a hollow winding core on which the web is wound is formed of a transparent material. Into this winding core, a hollow fixed shaft having a void portion at a portion thereof is inserted so that the winding core is rotatable. A light emitting section and a light receiving section are positioned within the hollow fixed shaft and light is radiated through the void portion towards the winding core. The terminal of the web is connected to a light reflecting member, and the other end of the light reflecting member is fixed to the winding core, and the light reflecting member is wound upon the winding core more than one winding. As long as the web is wound on the winding core, the light from the light emitting section is reflected from the light reflecting member and the light receiving section receives the reflected light. However, as the light reflecting member is unwound and released from the winding core, the light from the light emitting section goes outside the winding core and the light receiving section becomes unable to receive the reflected light. Accordingly, the arrival of the web at the terminal is, detected by sensing that no light is received by the light receiving section.

4 Claims, 7 Drawing Figures

WEB TERMINAL DETECTING DEVICE

BACKGROUND OF THE INVENTION

The present invention relates to a web terminal detecting device for detecting the terminal of an ink ribbon accommodated in an ink ribbon cassette of a printer.

Ink ribbons for printers accommodated in a cassette case similar to a magnetic tape cassette are widely used. Various types of ink ribbon cassettes have been proposed in which a supply reel and a take-up reel are provided, and the leading end of the ink ribbon is fixed to the take-up reel and the terminal is fixed to the supply reel. Where both ends of the ink ribbon are respectively fixed to the supply reel and the take-up reel as described above, if the terminal of the ink ribbon is not accurately detected, the same portion of the ink ribbon will be used repeatedly for many times, and thus if the tape is of a one-time use type, the recording will become impossible, and if the tape is of a multi-time use type, the printing density will be gradually reduced. For this reason, it is required to detect the terminal of the ink ribbon to know that the ink ribbon has been used to the end, and to stop the printing or typing operation.

In order to meet such requirements, it has been known in the art to provide a light reflecting tape on the terminal of the ink ribbon, and to detect the terminal of the ink ribbon by optically sensing the light reflecting tape. For example, in U.S. Pat. No. 4,115,013, an ink ribbon terminal detecting device is disclosed in which optical detecting means having a light emitting section and a light receiving section is provided on a cassette supporting portion of a printer, and an opening for inserting the optical detecting means is formed near the exit of the ribbon of the ink ribbon cassette. A light reflecting mark is affixed to the terminal of the ink ribbon, and by detecting the light reflecting mark by the optical detecting means, the terminal of the ink ribbon is detected. In this ink ribbon terminal detecting device, however, since the optical detecting means is provided in the vicinity of the ink ribbon, if the ink ribbon is glossy, light emitted from the light emitting section and illuminating the ink ribbon will be reflected by the ink ribbon. And hence, there is a problem that if the reflected light is received by the light receiving section then a signal indicating the terminal of the ribbon will be generated.

SUMMARY OF THE INVENTION

An object of the present invention is to provide a web terminal detecting device for detecting the winding end of a web material such as an ink ribbon and the like with simple construction but accurately.

Another object of the present invention is to provide a web terminal detecting device in which a fixed shaft which is inserted into and fitted to a winding core for a web material and which supports the winding core rotatably is made hollow, and a light emitting section and a light receiving section are accommodated in the shaft, thereby to eliminate the influence of outside irregular light.

According to the present invention, a web terminal detecting device comprises a housing for accommodating therein a web wound upon a hollow winding core, a hollow fixed shaft for rotatably supporting the winding core for the web, said fixed shaft having a light transmitting portion at a portion of the periphery thereof, a light reflecting member provided on the terminal of the web and having a length sufficient to cover at least the transmitting portion of the fixed shaft, and detecting means positioned in the hollow fixed shaft for detecting the light reflecting member, said detecting means having a light emitting section for radiating light towards the void portion and having a light receiving section for receiving the light reflected from the light reflecting member, wherein as the light reflecting member is unwound and released from the winding core, the light from the light emitting section passes through the void portion to the outside of the winding core, and the terminal of the web is detected by sensing that no reflected light is received by the light receiving section.

According to a preferred embodiment of the present invention, the winding core is formed of a transparent material, and the light reflecting member has a length sufficient to be wound around the winding core at least one winding. In this construction, when the light reflecting member is unwound from the winding core, the light radiated from the light emitting section goes outside the winding core and no light is received by the light receiving section. Thus, it is possible to detect that the web has been wound to the terminal by sensing that no light enters the light receiving section.

In the web terminal detecting device of the present invention, the fixed shaft which supports the winding core for the web is made hollow, and the detecting means is inserted in this hollow portion. Thus, since no particular space for the detecting means is necessary, the ink ribbon cassette can be made small-sized. Further, since the light is emitted within the hollow portion of the fixed shaft, and the reflected light is received in the hollow portion, there is no influence of outside irregular light, and hence the terminal can be detected accurately.

DESCRIPTION OF THE PREFERRED EMBODIMENTS

Figure 1:
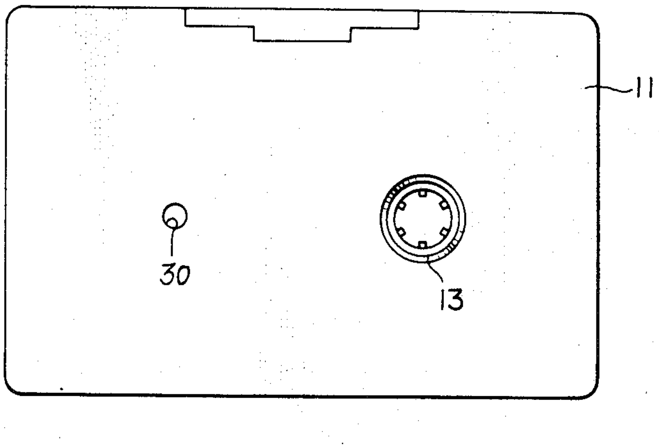
FIG. 1 is a bottorn view showing an exterior appearance of a first embodiment of the present invention.
Figure 2:
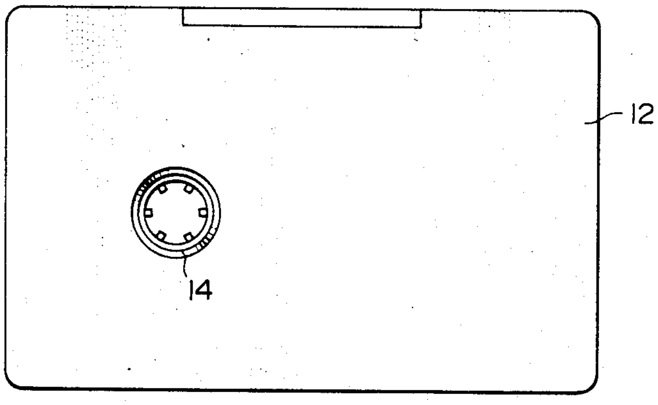
FIG. 2 is a top view of FIG. 1.
Figure 3:
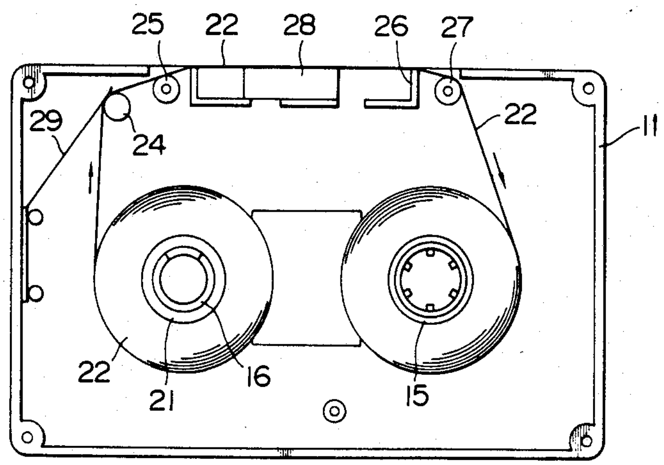
FIG. 3 is a plan view in which an upper casing of FIG. 1 is removed.

Referring to FIG. 1 through FIG. 5, a first embodiment of a web terminal detecting device according to the present invention will be described. Throughout the embodiments like reference characters designate like parts, and their detailed descriptions are omitted. First, referring to FIG. 1 and FIG. 2, an ink ribbon cassette consists of an upper casing 11 and lower casing 12. In the casings 11 and 12, openings 13 and 14 are respectively provided so that the axes thereof are aligned when both casings are assembled. Into the openings 14 and 13, a hollow take-up shaft 15 is rotatably inserted. In the lower casing 11, as shown in FIG. 3, at the left of the take-up shaft 15, a lower end of a fixed hollow shaft 16 is mounted. Within the fixed hollow shaft 16, a light emitting section 17 for radiating light outwardly and a light receiving section 18 for sensing reflected light and for generating an output signal are positioned. In a portion of the fixed hollow shaft 16 towards which the light is radiated from the light emitting section 17, a void portion 19 is provided. Around the fixed shaft 16, a ring-shaped winding core 21 made of a transparent synthetic resin is rotatably fitted. To this ring-shaped winding core 21, one end of a light reflecting tape 23 is fixed and the other end is connected to one end of an ink ribbon 22. The light reflecting tape 23 has a length sufficient to form at least one winding around the winding core 21. The other end of the ink ribbon 22 is fixed to the take-up shaft 15 through guide pins 24 and 25, passing through a recess 26 formed on the upper side of the ink ribbon cassette, and through a guide pin 27. In the recess 26, a printing head 28 of a printer is inserted, and printing is made on a recording medium (not shown) through the ink ribbon 22. The ink ribbon 22, passing through the guide pin 24, is urged lightly against the guide pin 24 by a tip of a leaf spring 29, the other end of which being fixed to a side wall of the lower casing 11. This urging is to prevent sagging or loosening of the ink ribbon 22.

Figure 4:
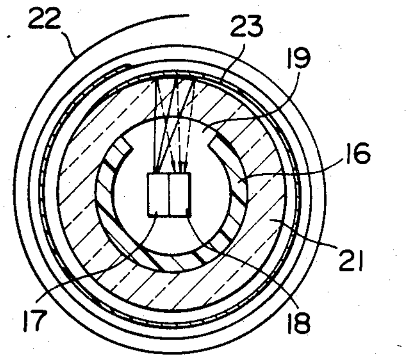
FIG. 4 is a plan view showing by enlarging a condition in which a tape is wound on a fixed hollow shaft.
Figure 5:
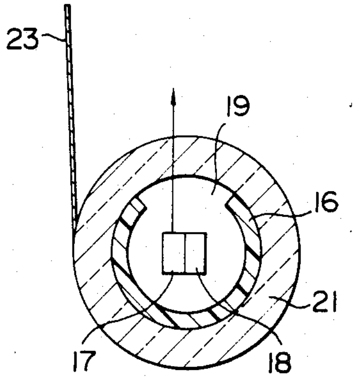
FIG. 5 is plan view showing by enlarging a condition of the fixed hollow shaft when the tape reached the terminal.

In operation, as the take-up shaft 15 rotates to wind the ink ribbon 22, the winding core 21 rotates centering around the hollow fixed shaft 16, and the ink ribbon 22 is transferred in a direction shown by the arrow in FIG. 3. The ink ribbon 22 is unwound in this manner successively, and since the light reflecting tape 23 is wound on the periphery of the winding core 21, the light radiated from the light emitting section 17 is, as shown in FIG. 4, passes through the transparent winding core 21 from the void portion 19 and the light reflecting tape 23 is illuminated by the light. The light illuminating the light reflecting tape 23 is reflected and the reflected light passes through the winding core 21 and received by the light receiving section 18. By sensing the reflected light by the light receiving section 18, it can be determined that the ink ribbon 22 is still remaining on the winding core 21. In this instance, by forming the reflecting surface of the light reflecting tape 23 in a concave shape, the receiving of the reflected light by the light receiving section 18 can be ensured. Just before the ink ribbon 22 is completely unwound from the winding core 21, the light reflecting tape 23 which has been wound on the winding core 21 more than one winding is separated from the winding core 21 as shown in FIG. 5. As a result, the light radiated from the light emitting section 17 passes through the winding core 21 from the void portion 19 and goes outside the winding core 21, and thus no reflected light enters into the light receiving section 18. Therefor, the light receiving section 18 does not operate and based on this, it is possible to detect that the ink ribbon has reached the terminal.

Figure 6:
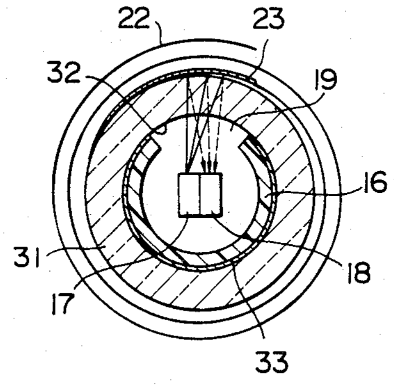
FIG. 6 is a plan view of a second embodiment of the present invention, which shows by enlarging a condition in which a tape is wound on a fixed hollow shaft.

FIG. 6 illustrates a second embodiment of the present invention in which the inner surface of a transparent winding core 31 is bonded or coated with a light reflecting material 33 retaining a transparent portion 32. The transparent portion 32 is located at a position corresponding to a void portion 19 of a fixed hollow shaft 16, which void portion is similar to the one in the first embodiment. To the terminal of an ink ribbon 22, one end of a light reflecting tape 23 is connected, and the light reflecting tape 23 has a length sufficient to cover the transparent portion 32. The other end of the light transparent tape 23 is fixed to the winding core 31. Until the terminal of the ink ribbon 22 reaches the terminal, the transparent portion 32 is covered by the light reflecting tape 23 and the rest portion of the winding core 31 is covered by the light reflecting material 33, and thus light emitted from the light emitting section 17 is reflected from the light reflecting tape 23 and from the light reflecting material 33, and the light receiving section 18 can receive the reflected light. When the ink ribbon 22 reaches the terminal, since the light reflecting tape 23 which has covered the transparent portion 32 is separated apart from the transparent portion 32, the light from the light emitting section 17 goes outside the winding core 31 and the light receiving section cannot not receive the reflected light any more, and thus the arrival of the ink ribbon 22 at the terminal can be detected.

Figure 7:
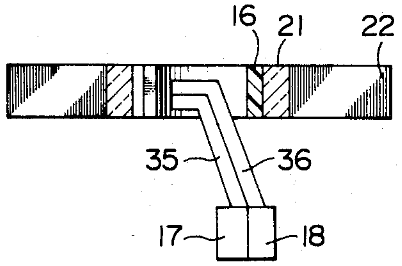
FIG. 7 is a sectional view of a main port showing a third embodiment of the present invention.

FIG. 7 shows a third embodiment of the present invention in which a light emitting section 17 and a light receiving section 18 are provided in equipment main body (not shown) of a printer or the like. In the center portion of a hollow fixed shaft 16, one ends of light transmitting members 35 and 36 such as a hollow pipe or an optical fiber are located, and the opening ends of the light transmitting members 35 and 36 are facing a void portion 19. The other ends of the light transmitting members 35 and 36 are respectively connected to the light emitting section 17 and light receiving section 18. Light emitted from the light emitting section 17 located outside the ribbon cassette, passes through the light transmitting mumber 35 and is radiated towards the void portion 19, and the reflected light is sent to the light receiving section 18 through the light transmitting member 36.

The light ernitting section 17 and the light receiving section 18 are inserted into the hollow fixed shaft 16 through an opening 30 provided on the lower casing 12. These sections 17 and 18 are rnounted on a cassete supporting portion of a printer (not shown).

In each of the embodiments described in the forgoings, the light receiving section 18 is arranged to produce a signal when reflected light is received. However, it will be apparent that the light receiving section 18 may be adapted to produce the signal when the reflected light is not received by the light receiving section 18. Furthermore, the decriptions are made as to the detection of the terminal of the ink ribbon, it will be easily understood by those skilled in the art that such a detection is also applicable to detect the winding end of a web such as a roll of paper and the like whose winding core is hollow.

I claim:

1. A web terminal detecting device comprising:

a housing for accommodating therein a web wound upon a hollow winding core;

a hollow fixed shaft provided on said housing for rotatably supporting said winding core of the web, said fixed shaft having a light transmitting portion at a portion of the periphery thereof;

a light reflecting member provided on the terminal of the web and having a length sufficient to cover at least said light transmitting portion of said fixed shaft; and detecting means positioned in said hollow fixed shaft for detecting said light reflecting member, said detecting means having a light emitting section for radiating light towards said light transmitting portion and having a light receiving section for receiving the light reflected by said light reflecting member, Wherein as said light reflecting member is unwound and released from said winding core, the light from said light emitting section passes through said light transmitting portion to the outside of said winding core, and the terminal of said web is detected by sensing that no reflected light is received by said light receiving section.

2. A web terminal detecting device according to claim 1, wherein said light reflecting member has a length sufficient to be wound on said winding core at least one winding.

3. A web terminal detecting device according to claim 1, wherein an inner surface reflecting member is provided on the inner surface of said winding core except at least an area equal to that of said light transmitting portion.

4. A web terminal detecting device according to claim 1, wherein said detecting means has light emitting means and light receiving means provided outside of said housing, and has light transmitting members, one ends thereof respectively connected to said light emitting means and said light receiving means, the other ends of said light transmitting members being located in said hollow section and facing said light transmitting section.

* * * * *